(12) United States Patent
Monroe

(10) Patent No.: US 6,831,676 B2
(45) Date of Patent: *Dec. 14, 2004

(54) VIRTUAL VIDEO TELECONFERENCING SYSTEM

(76) Inventor: David A. Monroe, P.O. Box 780907, San Antonio, TX (US) 78278-0907

( * ) Notice: Subject to any disclaimer, the term of this patent is extended or adjusted under 35 U.S.C. 154(b) by 0 days.

This patent is subject to a terminal disclaimer.

(21) Appl. No.: 10/358,660

(22) Filed: Feb. 5, 2003

(65) Prior Publication Data

US 2003/0117487 A1 Jun. 26, 2003

Related U.S. Application Data

(63) Continuation of application No. 08/882,569, filed on Jun. 25, 1997, now Pat. No. 6,545,700.

(51) Int. Cl.[7] .................................................. H04N 7/14
(52) U.S. Cl. ................................ 348/14.08; 348/14.07; 348/14.09
(58) Field of Search ..................... 348/14.01–14.09, 348/14.1, 14.11–14.13; 345/753; 370/260

(56) References Cited

U.S. PATENT DOCUMENTS

| | | | |
|---|---|---|---|
| 4,400,724 A | 8/1983 | Fields | 348/14.1 |
| 5,272,526 A | 12/1993 | Yoneta et al. | 348/14.1 |
| 5,365,265 A | 11/1994 | Shibata et al. | 348/14.1 |
| 5,534,914 A | 7/1996 | Flohr et al. | 348/14.1 |
| 5,572,248 A | 11/1996 | Allen et al. | 348/14.1 |
| 5,745,161 A | 4/1998 | Ito | 348/14.09 |
| 5,751,337 A | 5/1998 | Allen et al. | 348/14.07 |

FOREIGN PATENT DOCUMENTS

| | | | | |
|---|---|---|---|---|
| JP | 405088239 A | 4/1993 | | G03B/15/02 |
| JP | 405344498 A | 12/1993 | | H04N/7/15 |
| JP | 406113336 A | 4/1994 | | H04N/13/00 |
| JP | 07-162532 | 6/1995 | | H04N/7/15 |
| JP | 407255044 A | * 10/1995 | | H04N/7/15 |

* cited by examiner

Primary Examiner—Melur Ramakrishnaiah
(74) Attorney, Agent, or Firm—Jackson Walker L.L.P.

(57) ABSTRACT

A video conferencing system utilizes a plurality of sensors or cameras to record the image of each attendee in order to generate a three-dimensional image thereof. The image signal is then merged and displayed at a remote station where an actual attendee is present. The displayed image is a three-dimensional virtual conference room replicating the look and feel of a hands-on conference.

20 Claims, 9 Drawing Sheets

VIRTUAL VIDEO TELECONFERENCING SYSTEM

CROSS REFERENCE TO RELATED APPLICATIONS

This application is a continuation of and claims priority from a U.S. patent entitled "Virtual Video Teleconferencing System," Ser. No. 08/882,569, having a filing date of Jun. 25, 1997, now U.S. Pat. No. 6,545,700; the complete application, including the specification and drawings, being incorporated by reference herein.

FIELD OF THE INVENTION

The subject invention is generally related to video telephonic and teleconferencing systems and is specifically directed to a video teleconference system with computer enhanced video images utilizing a plurality of image collectors.

BACKGROUND OF THE INVENTION

Video telephonic systems were first introduced by Bell Laboratories and American Telephone & Telegraph in the 1950's. These early systems were hard wired and used a telephonic line in combination with a video transmission system to combine a television image with a telephone audio communication. While proving the concept of video teleconferencing, this early prototype had many drawbacks which prevented it from being widely accepted.

Over the years more sophisticated systems have been developed which address some of the drawbacks of the early Bell Labs and AT&T conferencing schemes. Examples of these are systems offered by Pictortel and Compression Labs. These devices provide multiple party teleconferencing with stations which generally are voice activated for displaying the party who is speaking to all of the other participants. Both single view formats for displaying only the party speaking or split screen formats for displaying all parties are available.

Over the last forty years video teleconference systems have improved by employing digital technology permitting simultaneous transmission of both the video and audio signals. More recently, satellite transmission has further enhanced the quality and reliability of video teleconferencing signal transmission and reception. Split screen, voice shifting, and other enhanced receiver technology has permitted the development of multi-party conferencing systems. Typically, when multi-party transmissions take place either the audio detection is used to switch video on the receiver screens, or split screen technology permits all parties to be simultaneously received.

However, for the most part core technology has remained unchanged. Each party has a basic single camera and a single audio transmission device. The video image transmitted by the system is still primarily a "flat" two-dimensional full face view often referred to in the industry as a "talking head."

While such systems are useful, and may also be used for conveying and discussing graphic information which may be transmitted over the video system, these systems do not create any sense of reality or of "being there." That is, both the speaker and the recipient are clearly in an isolated environment and the "feel" which is often essential to a good conference is not created or maintained. The often required interaction between participants is not enhanced by such a system. Also, multi-user conferencing is limited.

It is desirable that a video teleconferencing system provide a more "realistic" environment to promote a line conference atmosphere. That is, in order for a video teleconferencing to be an acceptable substitute for a true live conference, it must recreate the atmosphere of the conference. All parties must be in a natural appearing setting, such as sitting around a conference table with the capability of looking at each other. Only when this is achieved will video conferencing become an acceptable substitute for live, real-time conferences.

For example, discovery depositions for supporting litigation are typically face-to-face because of the interplay between the multiple parties during the course of the deposition and because of the need to generate a formal atmosphere in order to convey the importance of the proceedings to the deponent. While video teleconference depositions have been used to a limited extent, the results have been mediocre. The proper atmosphere just cannot be recreated using the prior art technology.

If video teleconferenced depositions could be improved, the costs savings to the judicial system alone would be monumental. This would more than compensate for the costs for initial installation of the system.

Therefore, there remains a need to provide a video teleconferencing system that replicates the true face-to-face conference room atmosphere where the feeling of a live conference is preserved. None of the available prior art accomplishes this.

SUMMARY OF THE INVENTION

The subject invention is specifically directed to a video teleconferencing system adapted for replicating the real time, face-to-face room environment by creating a virtual conference room in which the participants attend the conference via video image transmission. The system of the present invention utilizes a plurality of image representation receivers or video cameras to develop a three-dimensional image of the participants and the room. This image is digitized and computer analyzed to develop real time transmittable data which then can be merged with the separate images created by other remote parties to the conference. The merged images are then presented on a screen in such a manner that each participant/receiving party is viewing all of the other recipient/participants from a composite synthesized image. Each transmitted participant likewise appears to be sitting across from each of the other recipient/participants.

By using multiple camera imaging, each party can look at the other eye-to-eye and a particular recipient can observe the eye-to-eye contact of any other group of participants on his own screen. The overall impact of such a system creates an atmosphere of "being there," by creating a virtual conference room at the location of each recipient.

The preferred embodiment of the subject invention utilizes at least two cameras trained on each remote party in order to create a good "three-dimensional" image which may be digitized and computer enhanced. In addition, a monitor, graphics wall or screen may be employed for displaying graphic images such as charts, drawings, models and the like. All of the images are submitted to a central processor system, where they are merged to create the virtual conference room. The images are then transmitted to each of the recipient/participants remote locations with the image on each screen showing the virtual conference room and participants from the perceived eye view of the receiver. The effect of this approach is a virtual conference room with the look and feel of a live conference. The system can also be used to transmit an image of inanimate object which can be located at one of the participant sites or at a remote location, as well as an entirely computer synthesized virtual object.

The system of the subject inventions permits the participating remote stations to be linked in any of a variety of traditional network topologies such as, by way of example, a loop configuration or a star configuration, or combination, depending upon the number of participants. In addition, the system utilizes currently available transmission circuits making hardwired, satellite or current network and utility wiring suitable for transmission.

In the preferred embodiment, two cameras are utilized to provide different angle views of the participants to permit creation of a three-dimensional digitized "map" of the space and the participants using well known computer imaging technology. The various remote digital signals are then merged at a central processor system or "combiner" to develop the virtual conference room. This processor system may include single or multiple computers, special hardware and software. This image is then transmitted directly to each of the recipients for display on a video screen. The signals may be transmitted to and from the central processor system via satellite, wireless data network, standard commercial or private carriers or hard wiring. Rendering engines may be utilized to reduce the amount of real-time data which has to be transmitted during a conference application. For example, the 3-D image model of a particular participant may be mapped and saved at each location. When the participant is present during a conference, his image may be called from memory and only his movements need be transmitted and his virtual image is synthesized from his 3-D library model at the receiving end in order to provide real-time reaction and participation. This will greatly reduce the amount of real time data to be transmitted.

The subject invention greatly enhances the video conferencing experience by creating a virtual conference room with the look and feel of a "live" conference.

It is, therefore, an object and feature of the subject invention to provide a video teleconference system having enhanced computer resynthesized images replicating the look and feel of a live conference.

It is also a subject and feature of the subject invention to provide real time simultaneous transmission of video and audio images to a plurality of recipient/participants at a plurality of remote locations.

It is a further object and feature of the subject invention to provide a virtual conference room utilizing video imaging technology.

It is also an object and feature of the invention to provide a means and method for inserting virtual objects in video conferencing to remote participants utilizing imaging processing technology.

Other objects and features of the invention will be readily apparent from the accompanying drawings and detailed description of the preferred embodiments.

DETAILED DESCRIPTION OF THE INVENTION

Figure 1:
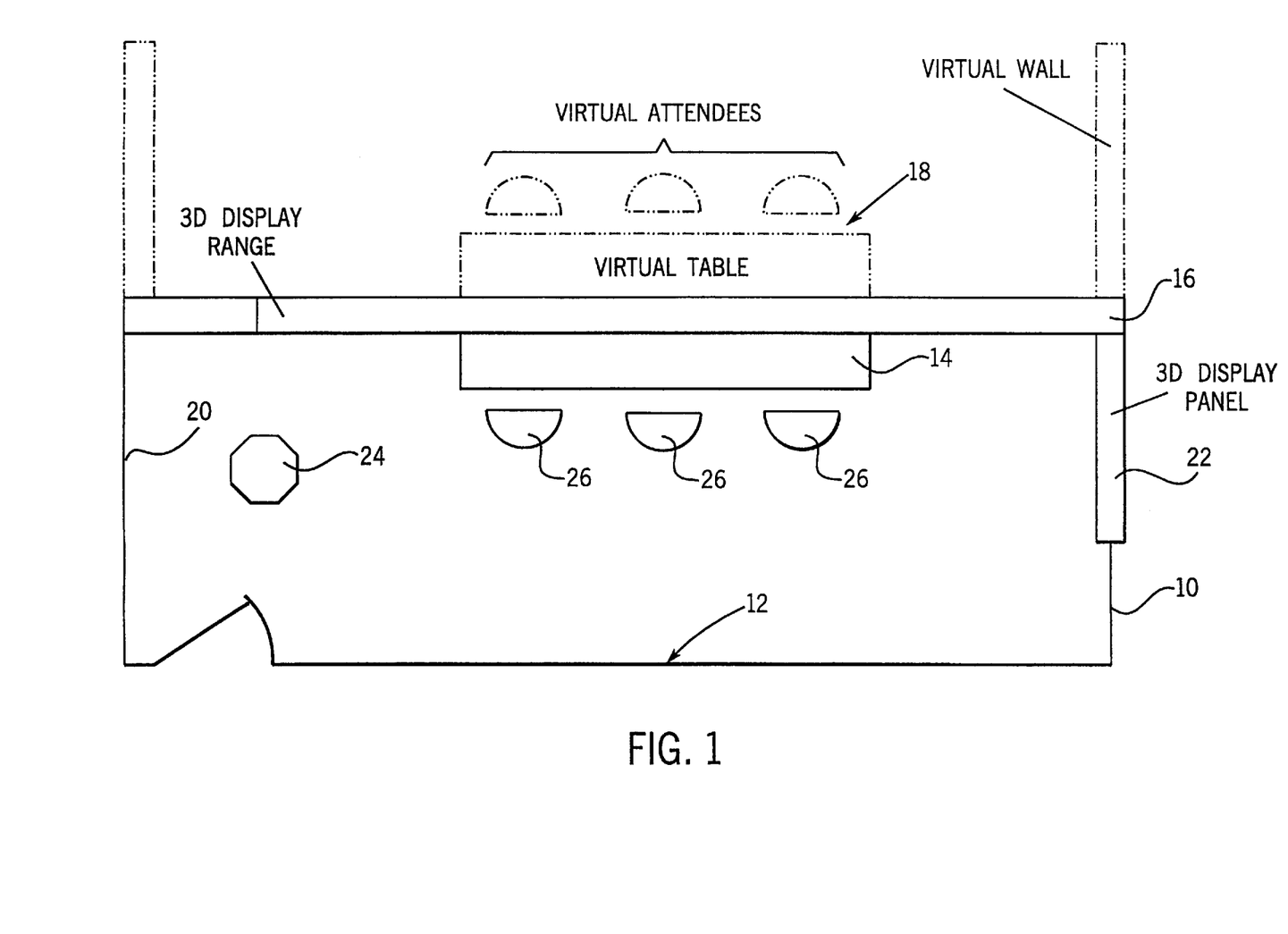
FIG. 1 is a diagrammatic view of a virtual conference room in accordance with the subject invention.

A basic layout for a virtual conference system in accordance with the subject invention is shown in FIG. 1. Typically, a dedicated room (10) will be utilized. An office "Video Workstation" could also be included in the network. The back wall (12) will define a suitable background for video images positioned in front of the wall. A conference table, desk or seating area as indicated by table (14). In the illustrated embodiment, the conference table (14) faces a display wall or panel (16) upon which the "virtual" attendees (18) will be displayed. In a typical installation, the room will also include a graphics display or drawing wall (20) disposed opposite a second display panel (22). The display panel or wall (20) may include a panel upon which drawings or text may be physically created, or may be used as a support and background panel for printed materials. The display panel (20) may also be used as a backdrop for physical models placed in front of it as indicated at the model table (24). In the illustrated embodiment, the actual attendees sit in chairs (26) facing the virtual attendees on the screen or panel (16).

Figure 2:
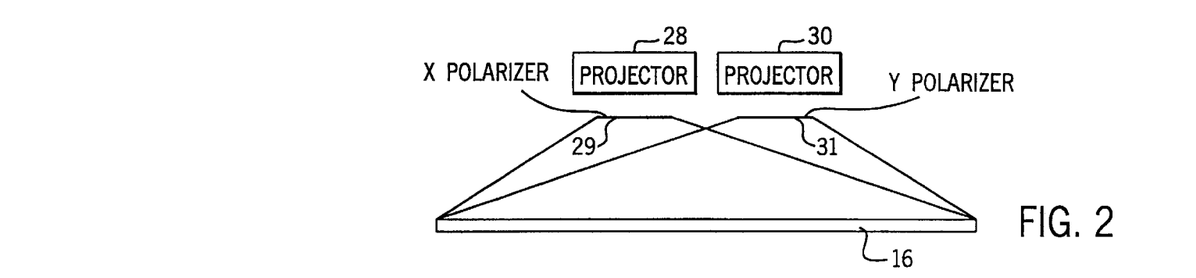
FIG. 2 is a diagrammatic view of the first embodiment of a polarized television projection system for use with the virtual conference room of FIG. 1.
Figure 3:
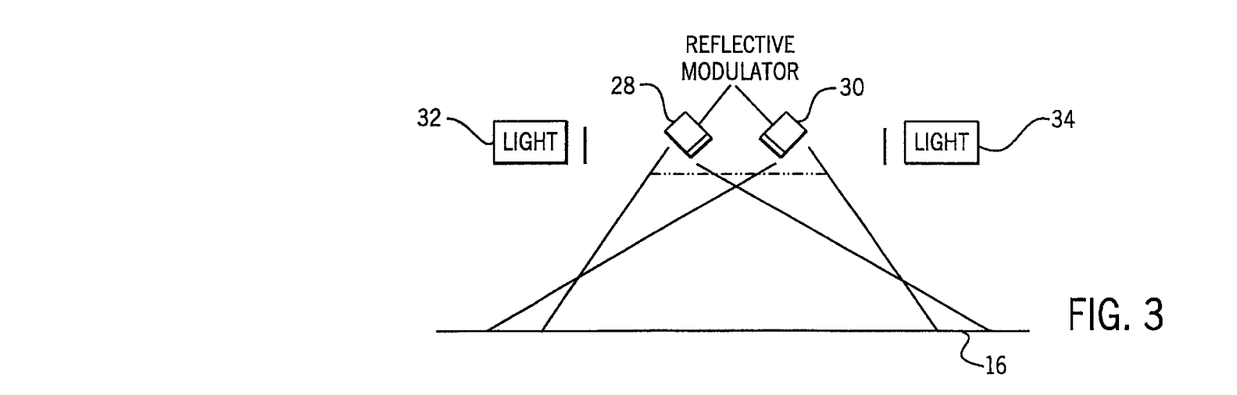
FIG. 3 is a diagrammatic view of a second embodiment of a polarized television projection system for use with the virtual conference room of FIG. 1.
Figure 4A:
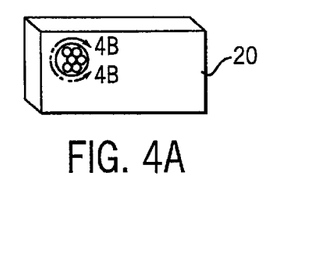
FIG. 4 is a diagrammatic view of a polarized projection system for use with a flat, graphics panel in connection with the virtual conference room of FIG. 1.
Figure 4B:
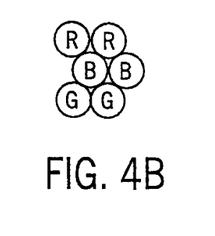

As better shown in FIGS. 2–4, the images of the actual attendees are captured by a plurality of video sensors or cameras (28, 30). The cameras are placed behind the panel (16) (typically above and behind it to avoid interference with the screen) and are focused on the attendees. As shown in FIG. 2, a typical three-dimensional television projection system may be utilized such as with the two-camera system (cameras 28, 30) and polarizers (29, 31, respectively), used to provide both x and y polarization to create a three-dimensional image of the attendees, in the well known manner. Where desired, and as shown in FIG. 3, a reflective system may also be used with the cameras (28, 30) placed in conjunction with a plurality of light sources (32, 34) to define the three-dimensional image. The polarizers may be positioned at the light source, at the reflective modulator sensors or cameras, or after modulation, as desired, and in the well known manner.

A typical display panel system is shown in FIG. 4. The panel (20) will be installed at each of the receiving stations and may encompass any of the well known front or rear projection television technologies.

Figure 5:
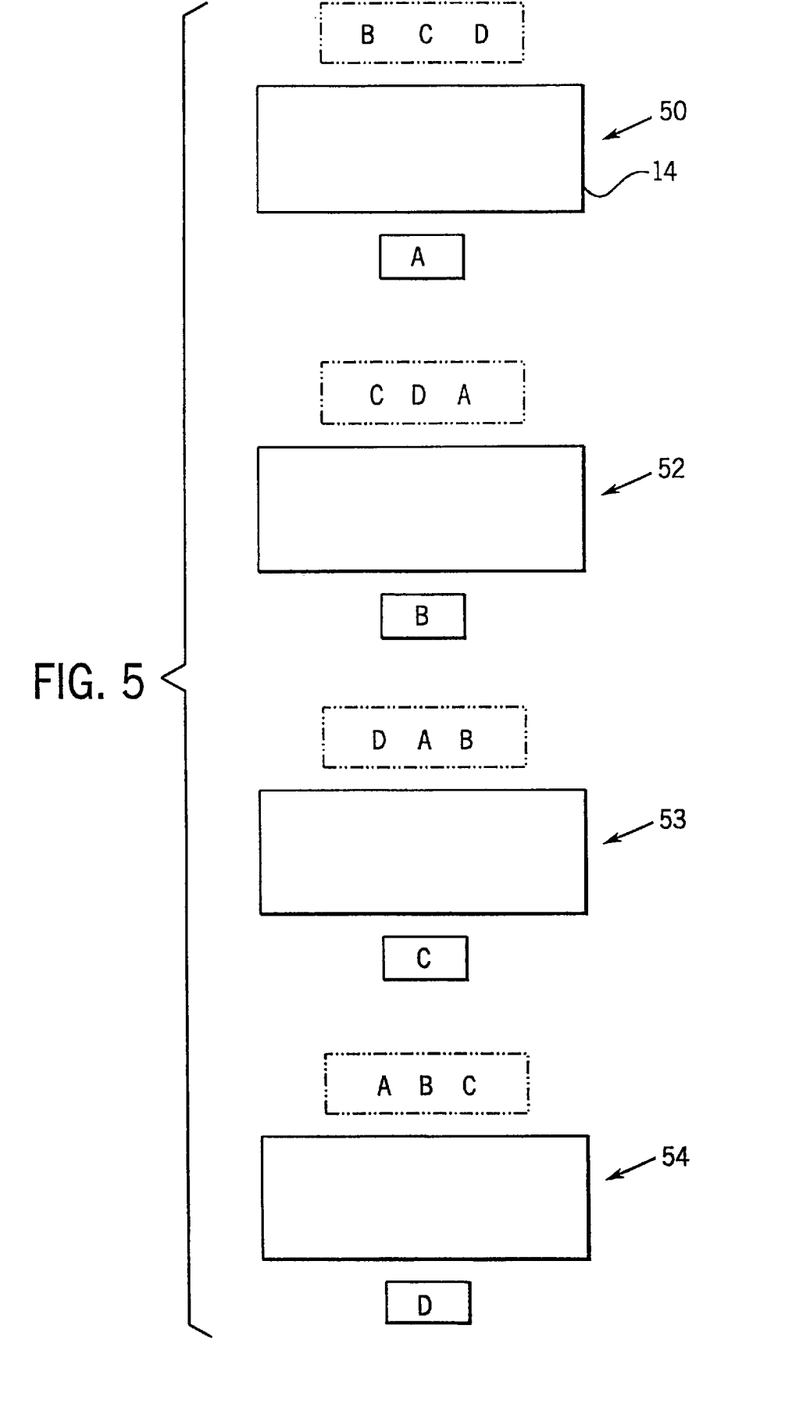
FIG. 5 is a view illustrating a typical presentation of remote recipient/participants utilizing the teachings of the subject invention.

With reference to FIG. 5, a typical virtual conference will include a plurality of recipient/participants. In the illustrated example, four remote stations A, B, C and D are participating. One or more attendees A will sit at a table (14) in a first location (50) and will "conference" with virtual attendees B, C, and D displayed on the screen in front of attendee A, as shown in FIG. 1. Likewise, one or more attendees B will be at a second location (52), and will view virtual attendees C, D and A; attendee(s) C will view virtual attendees D, A and B at location (53); and attendee(s) D will view virtual attendees A, B and C at location (54).

Figure 6:
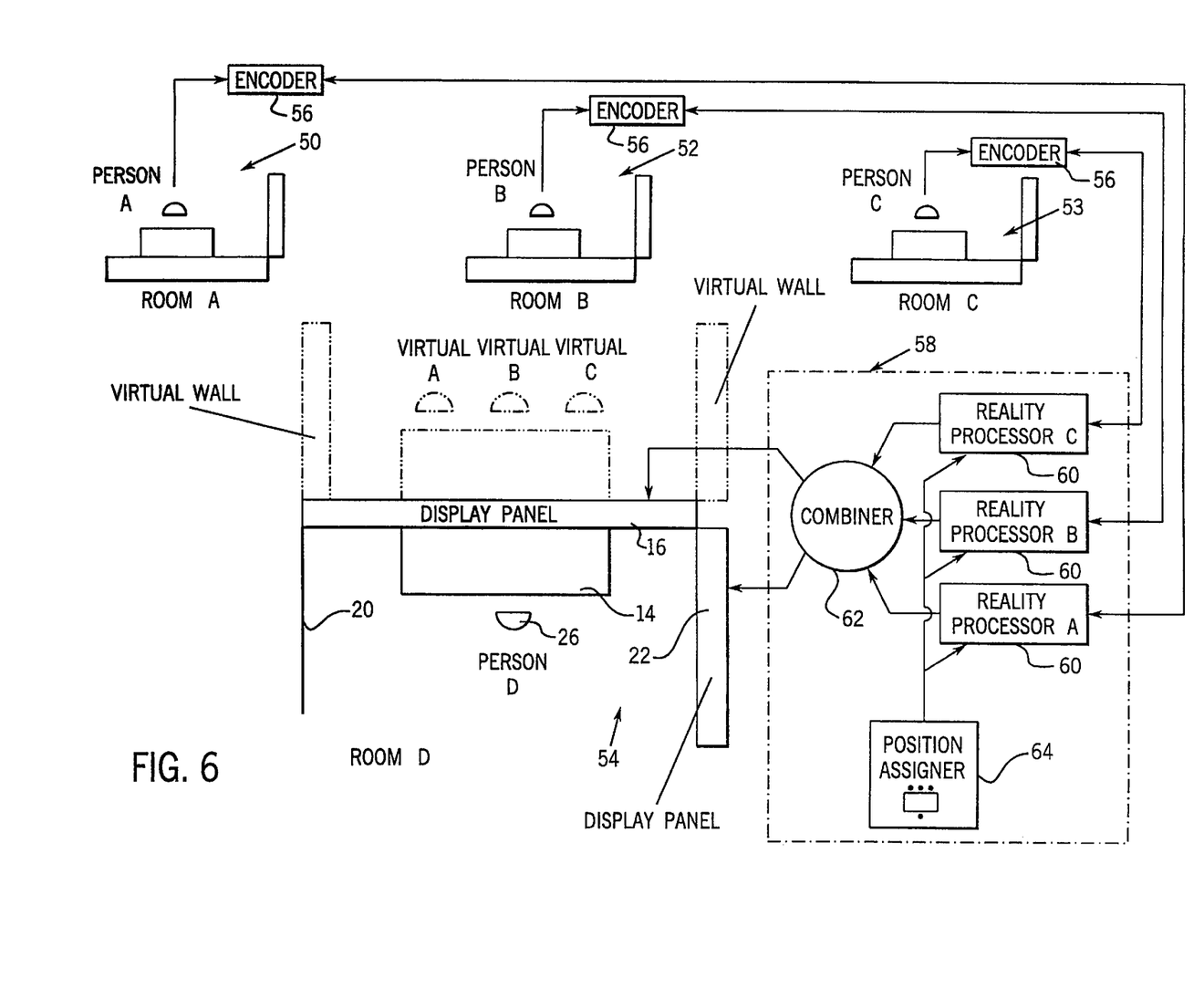
FIG. 6 is a diagrammatic illustration of a network mode for the system shown in FIG. 5.

A more detailed diagrammatic illustration of this is shown in FIG. 6, from the perspective of attendee D at location (54). In the illustrated embodiment, each of the stations or locations (50, 52, 53 and 54) are set up in the same manner as the conference room layout of FIG. 1, with a table (14) facing a display screen (16), and including a display panel (22) and a drawing wall or panel (20). The image from each location, as picked up by the cameras (28, 30) and the display panel system (see FIGS. 2, 3 and 4) is digitized and encoded, as diagrammatically illustrated by the encoder (56) at each station. The digitized, encoded signal is transmitted to a central processing unit or system (58), where each signal is processed by a dedicated processor (60) and merged and combined at (62) to be transmitted to the receiving screen (16). Where desired, a position algorithm may be employed, as indicated at (64) to assign position of the virtual attendees A, B and C on the display screen. The system embodied in the central processing unit (58) is duplicated at each remote location (50, 52 and 53), whereby all of the recipient/participants can attend the virtual conference. The number of participants is only a factor of system capacity.

Figure 7:
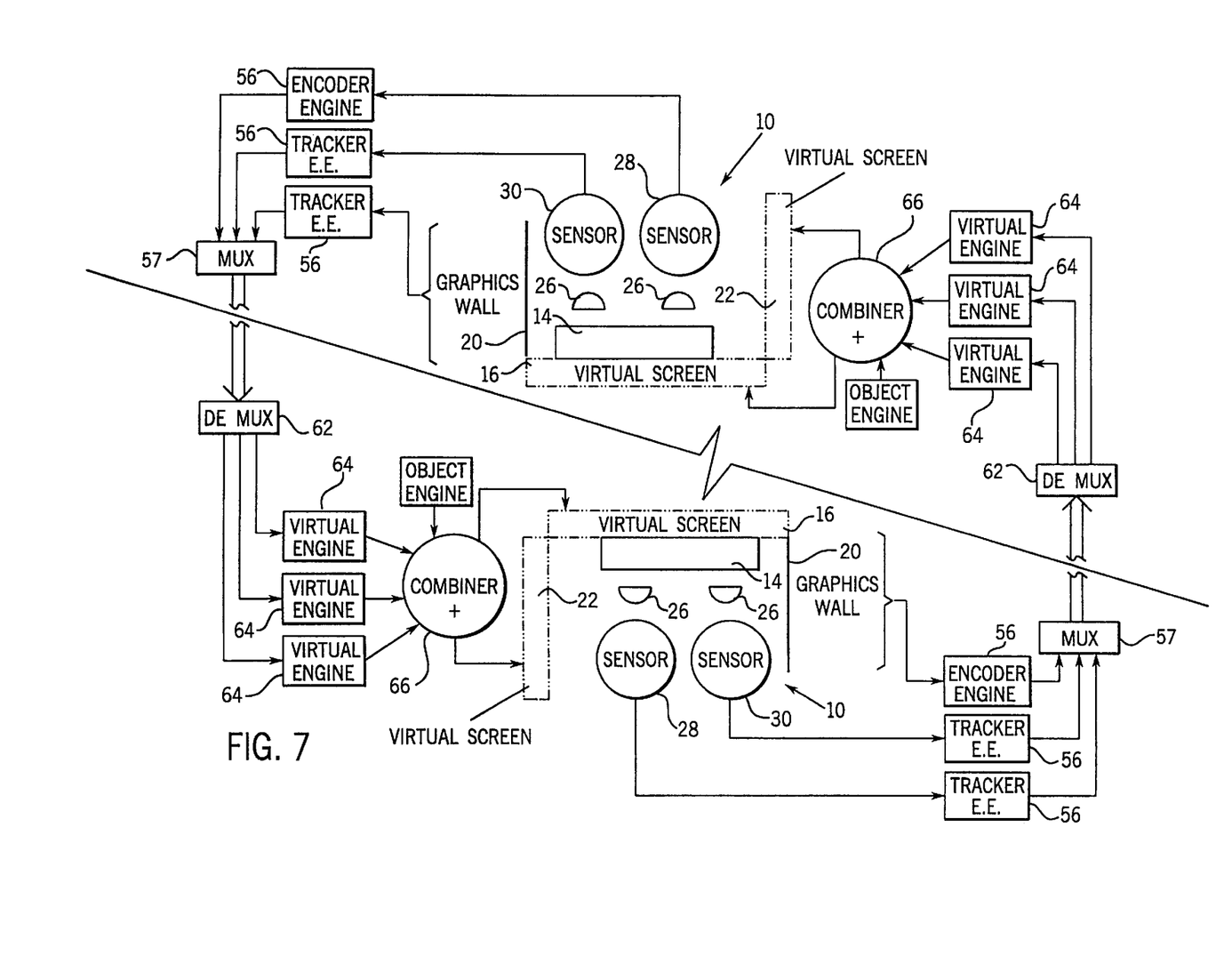
FIG. 7 is a detailed diagram of a network for supporting the virtual conference room of the subject invention.

A more detailed diagram of the system components is illustrated in FIG. 7. For simplicity, a two-party system is shown. It will be understood that additional parties maybe added by duplicating the system at various remote stations. In the preferred embodiment each virtual conference room (10) includes a pair of cameras or sensors (28, 30) for defining a three-dimensional location and position of the actual attendees in the room (see FIGS. 2 and 3). The drawing or graphics wall (20) will also include a sensor in accordance with FIG. 4. Each camera or sensor will transmit the captured image signal to a dedicated encoder, where the signals are digitized and encoded. Each digitized signal is then transmitted to a multiplexed, from which the multiplexed, combined signal is transmitted via satellite, hardwire, or standard utility wiring to a receiving station. The receiving station includes a demultiplexer or splitter (62) for redefining the discrete signals produced by the dedicated encoders (56). These discrete signals are then transmitted to a dedicated image generator (64), from which they are transmitted to a merge system (66) for creating a virtual image to be displayed on screen (16) or display wall (22).

Figure 8:
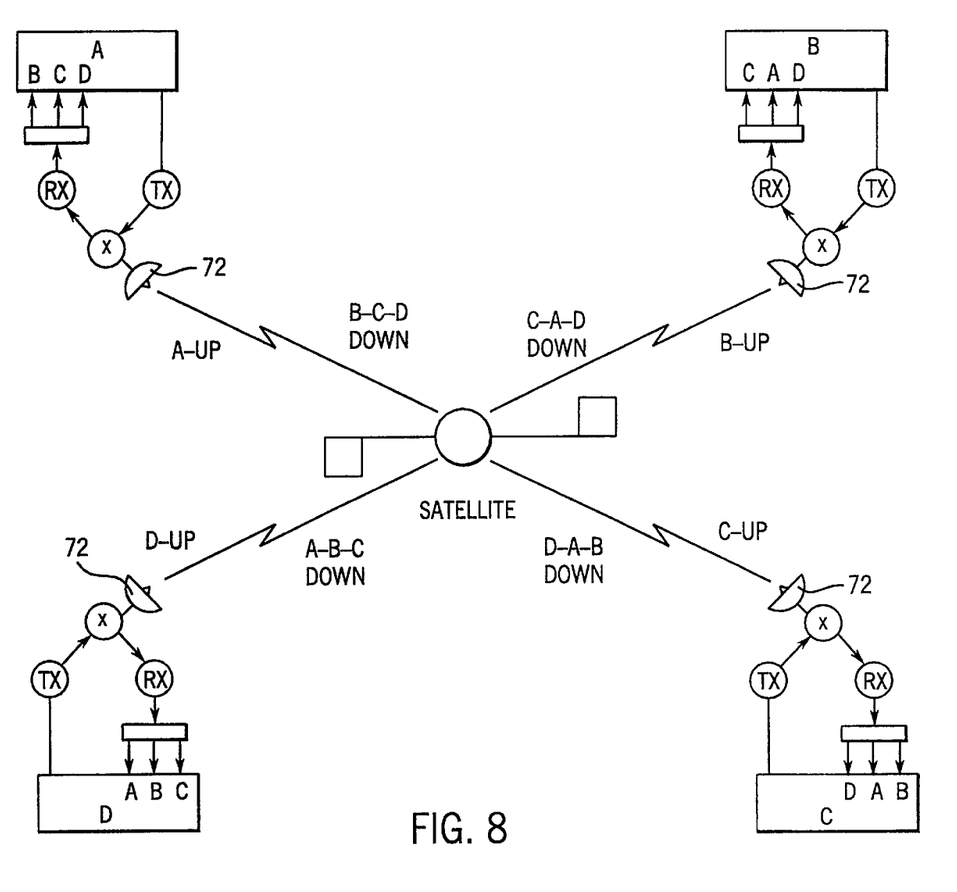
FIG. 8 shows a typical multi-site setup utilizing satellite transmission.

A typical star configuration utilizing satellite transmission via satellite (70) is shown in FIG. 8. Of course, other transmission systems such as a radio or airborne relay transponder, fibre optic networks, hard wired data transmission lines and radio can also be used. The site-to-site transmission system is a matter of choice dependent on cost constraints, speed, distance and quality of transmission. In this application, each of the remote stations (50, 52, 53 and 54) have dedicated satellite sending and receiving units (72). Other aspects of the system are essentially shown in FIG. 7.

Figure 10:
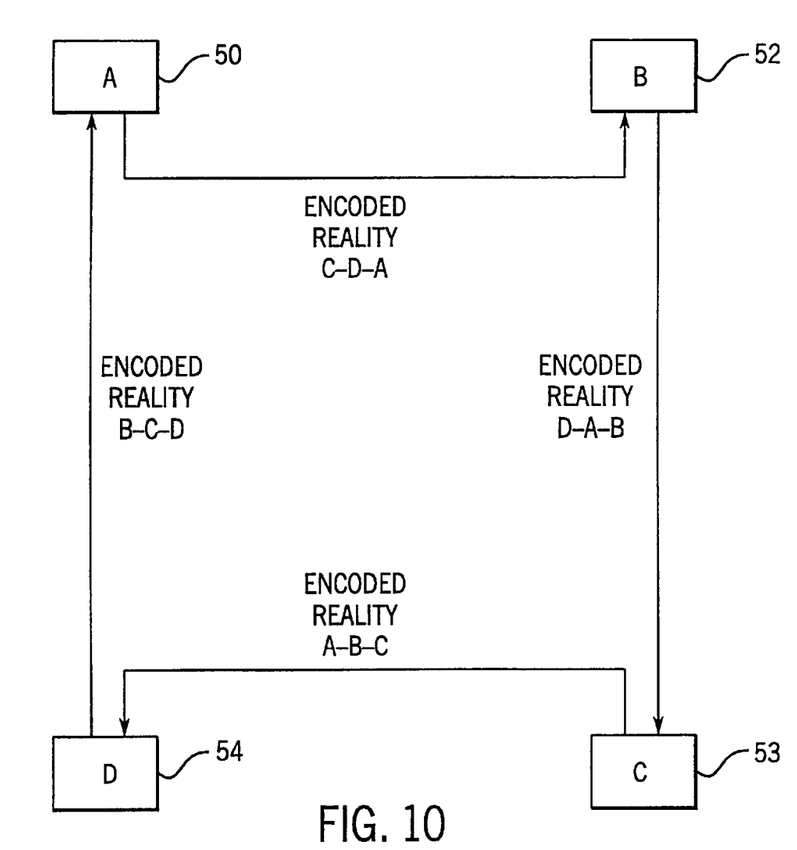
FIG. 10 shows a typical loop network system for a four station virtual conference room in accordance with the subject invention.

A loop relay system is shown in FIG. 10. The station components are identical to those shown in FIG. 7, with the exception that the transmitted signals are in a closed loop configuration with the encoded signals being relayed around the loop. Specifically, station A(50) would relay encoded signals C, D, and A to station B(52). Station B(52) would receive and display signals C, D and A and would relay signals D, A and B to station C(53). Similarly, station C(52) would receive and display signals D, A and B and would relay signals A, B and C to station D(54). In the four station example, station D(54) would receive and display signal A, B and C and would relay signals B, C and D to station A(50).

Figure 9:
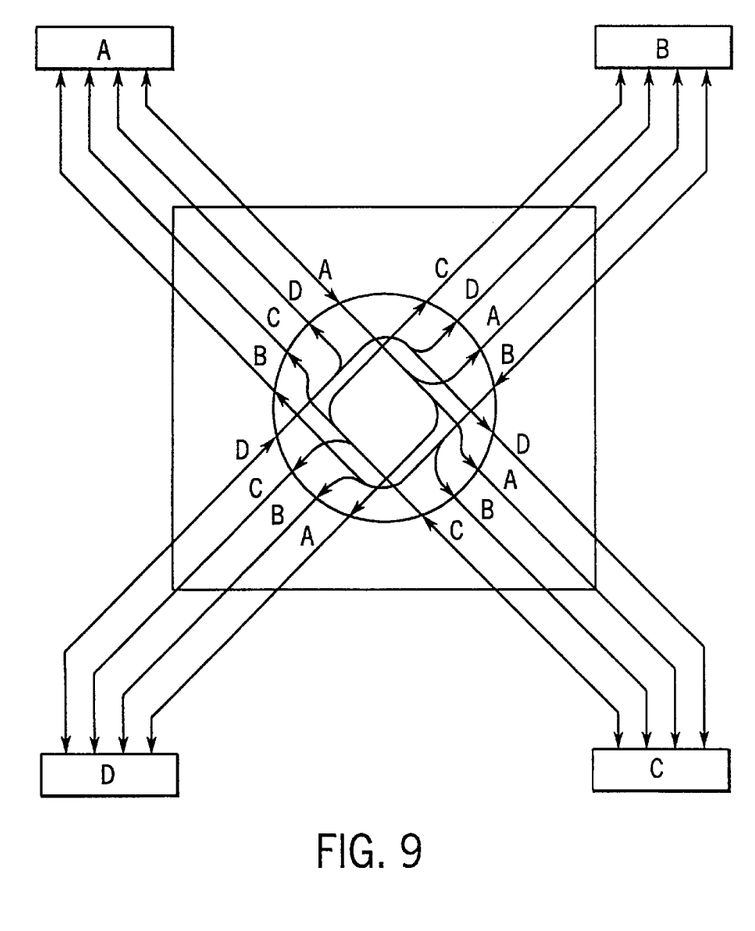
FIG. 9 shows a typical star network configuration for a four station virtual conference room in accordance with the subject invention.
Figure 11:
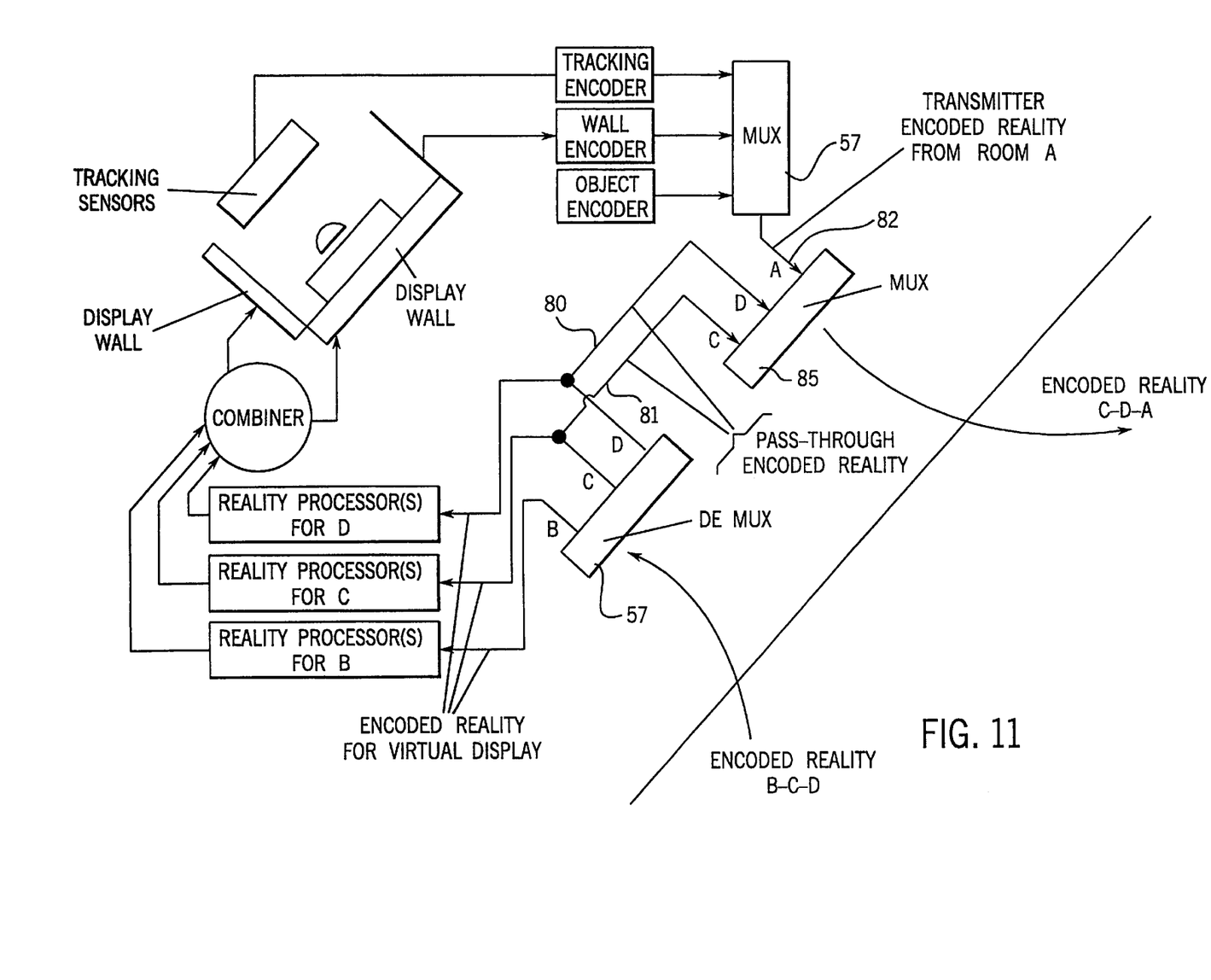
FIG. 11 is a detailed diagram of the system for supporting a single station of the virtual conference system in accordance with the subject invention.

FIG. 11 is a detailed illustration of the data handling scheme for a single station in the relay station of FIG. 10. The basic components match those of the star configuration illustrated in FIGS. 7–9. However, the relayed signals are transmitted directly from the demultiplexer via transmission lines (80, 81) to an auxiliary multiplexer (85) which receives the station signal to be multiplexed via line (82) from the station dedicated multiplexer (57).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A video teleconferencing system for providing a synthesized, virtual conference room with one or more actual attendees conferenced with one or more remote stations wherein remote attendees are positioned, all of the remote attendees simultaneously displayed on a single display screen, said attendees being physically present at one or more remote locations, the system having at least one local station for sending and receiving both video and audio signals and one remote station for sending and receiving both video and audio signals, the system comprising:

a display screen at each of said local and said remote stations, said display screen for displaying each of said remote attendees in a synthesized conference room setting by displaying the received video signals;

a plurality of sensors trained on each of said actual attendees at each of said local and said remote stations, said plurality of said sensors at each station adapted for generating a plurality of electronic signals representing one view of each of said attendees at each station, each of said stations adapted for displaying all of the remote attendees on said display screen for viewing by the actual attendee;

a system for combining said plurality of said electronic signals for generating a composite electronic signal representing all of said remote attendees; and an image generator for generating a three dimensional representation of each of said remote attendees for display upon said display screen.

2. The video teleconferencing system of claim 1, wherein said image generator further comprises at least one position assigner for assigning each of said attendees a display position upon said display screen.

3. The video teleconferencing system of claim 1, wherein said local station has more than one attendee and wherein a unique image and unique electronic signal is created for each attendee, said system further including a multiplexer at said local station for receiving and combining said unique signals for transmission to said remote station and a demultiplexer at said remote station wherein said unique signals are recreated for display at said remote station.

4. The video teleconferencing system of claim 1, further including at least two remote stations, further including a transmission and receiving network wherein the signals generated by each station are sent directly to every other station.

5. The video teleconferencing system of claim 1, wherein said plurality of local and remote stations are in a star configuration.

6. The video teleconferencing system of claim 1, further including at least two remote stations, further including a transmission and receiving network wherein the signals generated by each station are relayed through another station in a loop configuration.

7. The video teleconferencing system of claim 1 wherein said image generator comprises a three-dimensional television projection system.

8. The video teleconferencing system of claim 1 wherein said image generator comprises a plurality of polarizers.

9. The video teleconferencing system of claim 1 wherein said image generator comprises a plurality of cameras and a plurality of light sources.

10. A video teleconferencing system for providing a synthesized, virtual conference room with one or more actual attendees conferenced with one or more remote stations wherein remote attendees are positioned, all of the remote attendees simultaneously displayed on a single display screen, said attendees being physically present at one or more remote locations, the system having at least one local station for sending and receiving both video and audio signals and one remote station for sending and receiving both video and audio signals, the system comprising:

- a display screen at each of said local and said remote stations, said display screen for displaying each of said remote attendees in a synthesized conference room setting by displaying the received video signals;
- a first plurality of sensors trained on each of said actual attendees at each of said local and said remote stations, said first plurality of said sensors at each station adapted for generating a first plurality of electronic signals representing one view of each of said attendees at each station, each of said stations adapted for displaying all of the remote attendees on said display screen for viewing by the actual attendee;
- a graphics wall at each local and remote station located adjacent to said display screen, said graphics wall having one or more sensors adapted for generating a second plurality of electronic signals representing one view of graphical or textual information upon said graphics wall;
- a system for combining said first plurality and said second plurality of said electronic signals for generating a composite electronic signal representing all of said remote attendees and all of said graphical or textual information; and
- an image generator for generating a three dimensional representation of 1) each of said remote attendees and 2) said graphical or textual information from each of said remote stations for simultaneous display upon said display screen.

11. The video teleconferencing system of claim 10, wherein said image generator further comprises at least one position assigner for assigning each of said attendees a display position upon said display screen.

12. The video teleconferencing system of claim 10, further comprising a graphics display panel located adjacent to said display screen.

13. The video teleconferencing system of claim 12, wherein said three dimensional representation of said graphical or textual information from each of said remote stations is displayed upon said graphics display panel.

14. A video teleconferencing system for providing a synthesized, virtual conference room with one or more actual attendees conferenced with one or more remote stations wherein remote attendees are positioned, all of the remote attendees simultaneously displayed on a single display screen, said attendee being physically present at one or more remote locations, the system having at least one local station for sending and receiving both video and audio signals and one remote station for sending and receiving both video and audio signals, the system comprising:

- a display screen at each of said local and said remote stations, said display screen for displaying each of said remote attendees in a synthesized conference room setting by displaying the received video signals;
- a first plurality of sensors trained each of said actual attendees at each of said local and said remote stations, said first plurality of said sensors at each station adapted for generating a first plurality of electronic signals representing one view of each of said attendees at each remote station, each of said stations adapted for displaying all of the remote attendees on said display screen for viewing by the actual attendee;
- a graphics wall at each of said local and said remote stations located generally perpendicular to said display screen, said graphics wall having one or more sensors adapted for generating a second plurality of electronic signals representing one view of graphical or textual information upon said graphics wall;
- a system for combining said first plurality and said second plurality of said electronic signals for generating a composite electronic signal representing all of said remote attendees and said graphical or textual information upon said graphics wall of said remote station;
- an image generator for generating a three dimensional representation of 1) each of said remote attendees for display upon said display screen and 2) said graphical or textual information; and
- a graphics display panel for displaying said three dimensional representation of said graphical or textual information and being located generally perpendicular to said display screen and generally parallel to said graphics wall such that said graphics wall, said display screen, and said graphics display panel form a generally C shaped configuration.

15. The video teleconferencing system of claim 14, wherein said image generator further comprises at least one position assigner for assigning each of said attendees a display position upon said display screen.

16. The video teleconferencing system of claim 14 further comprising a receiver for receiving, decoding and displaying the composite electronic signal at said remote station.

17. The video teleconferencing system of claim 14 further comprising a transmitter for transmitting said composite electronic signal to all of said remote stations.

18. The video teleconferencing system of claim 14 wherein said image generator comprises a three-dimensional television projection system.

19. The video teleconferencing system of claim 14 wherein said image generator comprises a plurality of cameras and a plurality of polarizers.

20. The video teleconferencing system of claim 14 wherein said image generator comprises a plurality of cameras and a plurality of light sources.

* * * * *